US009857054B2

(12) United States Patent
Booij et al.

(10) Patent No.: US 9,857,054 B2
(45) Date of Patent: Jan. 2, 2018

(54) OPTICAL BEAM SHAPING DEVICE AND SPOT LIGHT USING THE SAME

(71) Applicant: PHILIPS LIGHTING HOLDING B.V., Eindhoven (NL)

(72) Inventors: Silvia Maria Booij, Eindhoven (NL); Hendrikus Hubertus Petrus Gommans, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 114 days.

(21) Appl. No.: 15/067,032

(22) Filed: Mar. 10, 2016

(65) Prior Publication Data

US 2016/0265740 A1 Sep. 15, 2016

(30) Foreign Application Priority Data

Mar. 12, 2015 (EP) ..................... 15158752

(51) Int. Cl.
*F21S 8/00* (2006.01)
*F21V 5/04* (2006.01)
(Continued)

(52) U.S. Cl.
CPC .............. *F21V 5/045* (2013.01); *F21V 5/007* (2013.01); *F21V 5/008* (2013.01); *F21V 5/048* (2013.01); *G02B 3/0056* (2013.01); *G02B 3/0068* (2013.01); *G02B 3/08* (2013.01); *G02B 5/0215* (2013.01); *G02B 5/0278* (2013.01); *G02B 19/0014* (2013.01); *G02B 19/0066* (2013.01); *G02B 27/0961* (2013.01);
(Continued)

(58) Field of Classification Search
CPC ...... G03B 21/625; F21V 5/04; G02B 27/0961
See application file for complete search history.

(56) References Cited

U.S. PATENT DOCUMENTS 4,076,384 A 2/1978 Deml et al.
4,636,035 A * 1/1987 Clausen ............... G03B 21/625
359/457
(Continued)

FOREIGN PATENT DOCUMENTS

WO WO2012107097 8/2012

OTHER PUBLICATIONS

Peter Schreiber, et al., "Homogeneous LED-illumination Using Microlens Arrays", Nonimaging Optics and Efficient Illumination Systems II, Proc. of SPIE vol. 5942, Bellingham, WA, 2005, pp. 59420K-1 through 59420K-9.

*Primary Examiner* — Evan Dzierzynski (57) ABSTRACT

In various embodiments described herein, an optical beam shaping arrangement is disclosed. In one example, the optical beam shaping arrangement comprises a collimator for receiving light from an optical source, and providing a more collimated output, and an optical plate for receiving the more collimated output, the optical plate comprises a two dimensional array of lenses on an input side and a corresponding two dimensional array of lenses on the opposite output side. In at least one embodiment, the lenses on the input side each have a focal point at a corresponding lens on the output side, and the lenses on the output side each have a focal point at a corresponding lens on the input side, and at least some of the lenses on the output side are tilted with respect to the general plane of the optical plate.

11 Claims, 7 Drawing Sheets (51) Int. Cl.
    *G02B 19/00*       (2006.01)
    *G02B 5/02*        (2006.01)
    *G02B 27/09*       (2006.01)
    *F21V 5/00*        (2015.01)
    *G02B 3/00*        (2006.01)
    *G02B 3/08*        (2006.01)
    *G02B 27/30*       (2006.01)
    *F21Y 105/10*          (2016.01)
    *F21Y 115/10*          (2016.01)

(52) U.S. Cl.
    CPC .......... *G02B 27/30* (2013.01); *F21Y 2105/10* (2016.08); *F21Y 2115/10* (2016.08)

(56) References Cited

U.S. PATENT DOCUMENTS

| | | | |
|---|---|---|---|
| 5,963,305 A | 10/1999 | Mizouchi | |
| 6,621,533 B2 * | 9/2003 | Slack | G02B 5/3083 348/E9.027 |
| 2004/0008411 A1 | 1/2004 | Freese et al. | |
| 2011/0188242 A1 * | 8/2011 | Brick | G02B 3/0006 362/235 |
| 2013/0322075 A1 | 12/2013 | Hadrath | |

* cited by examiner

OPTICAL BEAM SHAPING DEVICE AND SPOT LIGHT USING THE SAME

FIELD OF THE INVENTION

This invention relates to an optical beam shaping device, particularly but not exclusively for use in lighting units for adjusting the properties of a spot light beam.

BACKGROUND

Designing a system or optics for a spot lighting effect is in general challenging, especially for light sources which are not completely uniform in their light output over angle or position. There are many light sources available, for example LEDs can be grouped into high power LEDs, medium power LEDs, low power LEDs, clustered LEDs and chip on boards.

High power LEDs can be dimensionally small, for example with an area of around 1 mm2, and the phosphor of the LED can be well matched with the area of the die. This leads to a relatively uniform colored light distribution with respect to the emission angle.

Medium power and low power LEDs are often somewhat larger, for example with an area of 2-6 mm2. This use of medium or low power LEDs often leads to color distribution effects, because these LEDs have the disadvantage that they emit light in all directions and that their color is not uniform over the entire LED.

Beam shaping is found in most lighting applications. Beam shaping optical elements for example include reflectors and collimators, and these are used in most luminaires.

The problem of color distribution becomes severe when using medium power light emitting diodes (LEDs) for generating white light or Red-Green-Blue (RGB) LEDs for generating color variable light. Even when such light sources are combined with optics having collimation characteristics, color distribution effects with respect to emission angle may result. This is a major issue and often obstructs the application of medium power LEDs.

When using LEDs in a spot light application, a collimated beam is desired and the color should be uniform over the entire spot.

A solution to make a collimated and uniform color beam from a divergent source with color non-uniformity is by first collimating the light with a collimator, and then mixing the color by means of a Koehler lens design.

A Koehler design consists of a double lens array, with one array on each side of a substrate, the two arrays together forming an optical plate. Both lens arrays are positioned in each other's focal plane and are aligned with respect to each other. The function of each Koehler lens pair is to re-distribute the light entering the first side of the substrate to remove angular information of the original beam spot.

Even with a collimator and optical plate, the output beam shape is difficult to control to have a desired intensity characteristic.

SUMMARY

According to examples in accordance with an aspect of the invention, there is provided an optical beam shaping arrangement, comprising: a collimator for receiving light from an optical source, and providing a more collimated output; and an optical plate for receiving the more collimated output, wherein the optical plate comprises a two dimensional array of lenses on an input side and a corresponding two dimensional array of lenses on the opposite output side, wherein the lenses on the input side each have a focal point at a corresponding lens on the output side, and the lenses on the output side each have a focal point at a corresponding lens on the input side, and wherein at least some of the lenses on the output side are tilted with respect to the general plane of the optical plate.

The optical plate functions as an array of Koehler lens pairs. The tilting of the lenses on the output side of the optical plate is used as a design parameter for adjusting the beam shaping properties of the optical plate. In particular, the tilt adds a diffusing function to the color mixing function of the Koehler lens pairs. The two dimensional array defines a grid of lenses each positioned at their own location on the optical plate.

The tilt of at least some lenses is for example towards or away from the center.

The tilt provides an inclination of the optical axis of the lens with respect to the normal direction to the general plane of the optical plate. This tilt provides a diffusing and therefore beam broadening function.

The individual lenses may have a variety of shapes including a concentric pattern.

By forming an array of lenses into a grid, the individual lenses will be allocated a non-circular local area of the optical plate (since circles cannot be tessellated). The individual lenses may have truncated outer shapes, such as a hexagonal outer shape (for a hexagonal grid) or a square outer shape (for a square grid). The diffusion provided by the lens tilt prevents this local truncation of the lens shape translating to an undesired shape of the beam spot. In this way, it is possible to provide full lens coverage over the optical plate without the disadvantage of a non-circular beam spot.

The array of lenses may form a rotationally symmetric pattern, for example a simple bee-hive pattern. The rotationally symmetric pattern may have an order of rotational symmetry of 4 or more (e.g. a square grid with rotational symmetry 4 or a hexagonal grid with rotational symmetry 6). However, more complicated tessellations are also possible. Furthermore, not all lenses need to be the same shape, so that more complicated tessellations are possible, for example with 8-fold or 12-fold symmetry.

The lenses may not be regular polygons, or else there may be combinations of different polygons, in order to provide designs with these higher orders of rotational symmetry.

In one example, the lens array pattern may be a hexagonal grid, and the optical plate may then ensure a circular beam shape in the far field despite the hexagonal grid pattern. Furthermore, the angular intensity distribution can be controlled.

The tilted lenses for example have a base plane (perpendicular to the optical axis) which is inclined such that the intersection between the base plane and the general plane of the optical plate is a tangential line around the center. This means the tilt of the lenses is around the center of the plate, i.e. they are tilted towards or away from the center.

The optical axis of the tilted lenses is for example inclined to the normal (of the general plane of the optical plate) by a tilt angle, wherein the tilt angle is the same for all lenses at a same distance from the center. The optical plate is essentially rotationally symmetric (but with finite order of rotational symmetry), but the design may change with distance from the center.

The optical axes of all of the tilted lenses may be inclined to the normal (of the general plane of the optical plate) by the same tilt angle. This makes an optical plate design which is easy to implement. The tilt angle may instead vary across the plate, for example depending on the radius from the center.

A tilt angle for all tilted lenses is preferably below 40 degrees. A central lens is typically not tilted. The remaining lenses may all be tilted, but equally it is possible for regions of the optical plate to have non-tilted lenses. The collimator may comprise a Fresnel lens.

In other embodiments, a light unit is disclosed comprising a light source; and an arrangement as defined above for beam shaping of the light output from the light source.

The light source in some embodiments comprises an LED or an array of LEDs, and the light unit may then comprise an LED spotlight. The spotlight uses a beam shaping arrangement, for example a reflector body accommodating at least some LEDs, which provides a circular light intensity distribution in the far field.

BRIEF DESCRIPTION OF THE DRAWINGS

Examples will now be described in detail with reference to the accompanying, schematic drawings, in which.

DETAILED DESCRIPTION OF THE EMBODIMENTS

Embodiments described herein provide an optical beam shaping arrangement for example for use as part of a spot light. A collimator is for receiving light from an optical source, and providing a more collimated output. An optical plate is provided at the output of the collimator and comprises an array of lenses on an input side and a corresponding array of lenses on the opposite output side. The lenses form a grid. The lenses are arranged as Koehler lens pairs, and at least some of the lenses on the output side are tilted with respect to the general plane of the optical plate. This tilting provides a design option for improving the beam shaping properties.

Figure 1:
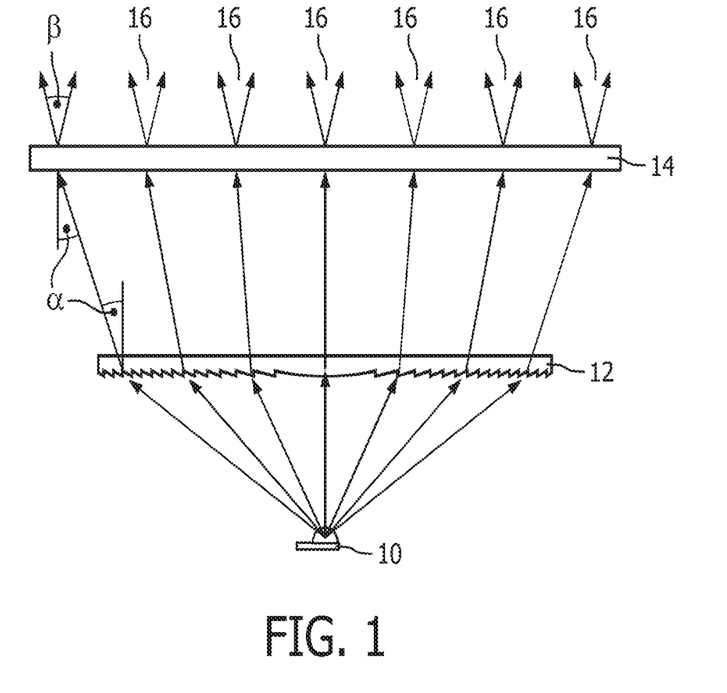
FIG. 1 shows a known beam shaping arrangement which combines a collimator and an optical plate.

FIG. 1 shows a known optical system which combines a collimator with an integrating plate which makes use of Koehler lens pairs. The system comprises a light source 10, for example an LED or LED array, a collimating optical element 12, which in this example is in the form of a collimating optical plate, and an integrating optical element in the form of a second optical plate 14.

The light source may comprise one or more lighting elements. If multiple light sources are used, they may for example be different color light sources. Alternatively, the light source may be a single color lighting element distributed over an area, or even a single lighting element with an output beam color and direction which varies as a function of position across its light output face.

The collimating optical plate 12 is for example a Fresnel lens, and it pre-collimates the light and delivers it to the integrating optical plate 14. This means the light exiting from any particular point on the surface of the collimating optical plate 12 has a limited range of angles forming a beamlet, for example an angular spread of less than 10 degrees. The angular spread of the beamlets is defined by the distance to the source and the source size.

The required degree of collimation for the incoming light to the optical plate 14 is determined by the Koehler design, for example the optical plate has an input acceptance angle of 20° each side of the normal. The orientation of the incoming beam is in the normal direction (perpendicular to the optical plate). If the optical plate is positioned directly after the collimator, their diameters will be almost the same. If the optical plate is far from the collimator as shown schematically in FIG. 1, it can be larger than the collimator while maintaining the light incident to the optical plate within the acceptance angle range.

Other lens designs may be used for the collimating function. The collimator may instead comprise a total internal reflection (TIR) collimator.

The integrating optical plate uses Koehler lens pairs, described further below.

The light exiting the collimating optical plate 12 has an output angle range with respect to the normal (shown as $\alpha$ in FIG. 1) which is within the acceptance angle of the second optical plate, for example $\alpha<\beta/2$ where $\beta$ is the acceptance angle and also the spread of output angles at the output of the second, integrating optical plate 14.

The integrating optical plate 14 forms a light beam 16 from each beamlet received from the collimating optical plate 12. The light beam is centered about the normal direction. Furthermore, light originating from different regions of the light source 10 (because it will not be a perfect point source) is preferably substantially uniformly mixed by the integrating optical plate 14.

The resulting beam output from the optical system is a superposition of the beams 16 formed by the integrating optical plate 14. Each of the beams 16 is uniformly mixed. The integrating optical plate 14 eliminates color artifacts based on this uniform mixing.

Figure 2:
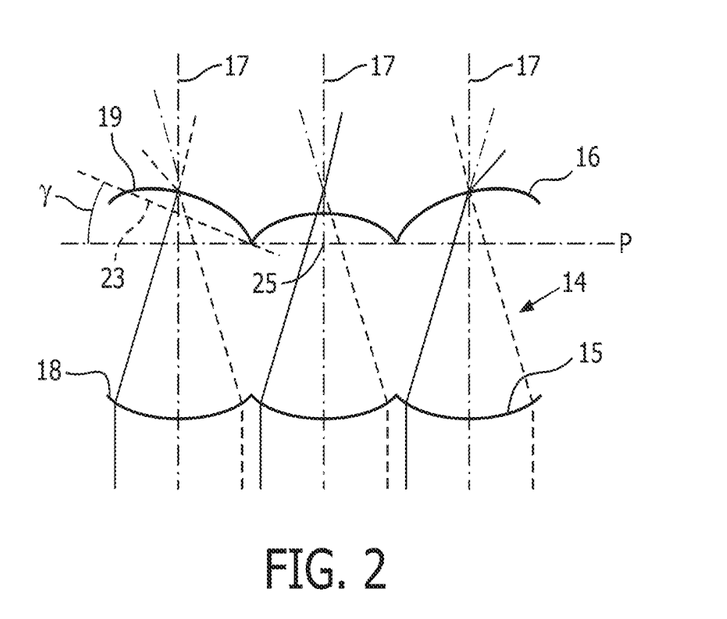
FIG. 2 shows a modified optical plate.

FIG. 2 shows the integrating optical plate 14 in more detail, and including the modification in accordance with the invention. It shows a known beam processing arrangement which makes use of Koehler lens pairs, modified by the introduction of a tilt to some of the output lenses.

The optical plate 14 comprises an upstream face 15 upon which are distributed a series of curved lens elements. This is the first face of the optical plate which faces the light source. The curved lens elements have a focal point at an associated opposite downstream face 16 of the optical plate 14. This is the second face of the optical plate which faces away from the light source.

The downstream face 16 of the optical plate 14 is configured with curved lenses or lens elements arranged in such a manner that each of the curved lens elements on the first face 15 has an associated optically aligned curved lens element on the second face 16.

Similarly, the curved lenses on the second face 16 have their focal point located at the first face 15. In this way, the curved lens elements on the second face 16 are configured to mix the light over an angular range following the focusing by the curved lenses located on the first face 15.

FIG. 2 shows a cross-sectional view of three lenses of the optical plate 14. The central lens is located on a center 25, either a central point or a central axis, of the general plane P of the optical plate and has no tilt. In this example the lenses to each side have a tilt towards the center. This causes the light to be directed away from the center. The surface normals for the lenses are shown by reference 17. The surface normal is the optical axis of the corresponding lens and is perpendicular to a base plane of the lens. The lens tilt provides a tilt of the surface normal so that it is not parallel with the normal direction for the general plane of the optical plate 14.

By way of example, the left Koehler lens pair comprises a first (input) lens 18 facing the incident light from the collimator and a second (output) lens 19 facing the output region to which the output beam is directed.

The output lens 19 has a base plane 23 which is tilted with respect to the general plane P of the optical plate by a tilt angle γ. The example shown in FIG. 2 has athe tilt angle γ is of around 300.

Figure 3:
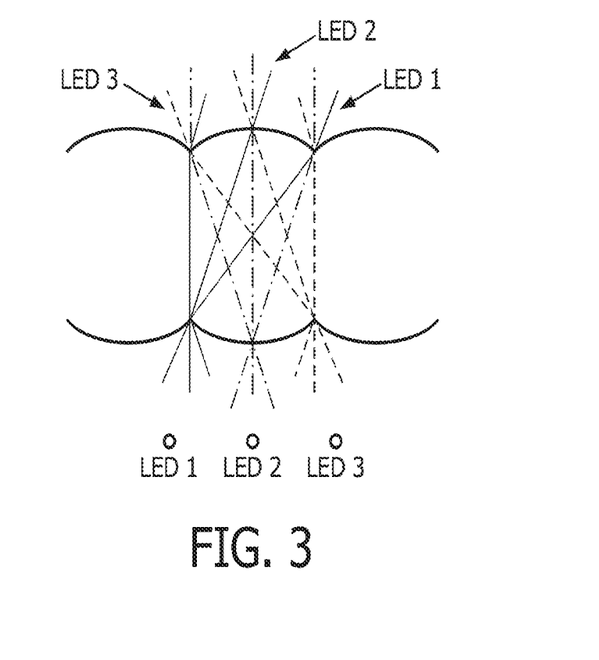
FIG. 3 shows how the optical plate may receive collimated light in a non-normal direction.

FIG. 2 shows the incident rays to the optical plate arriving in the normal direction. However, this is not essential. For example, if the light source comprises an array of LEDs, the different position of these LEDs with respect to the collimator will give rise to different incident angles of light for different LEDs. This is shown in FIG. 3, in which three different LEDs, LED1, LED2, LED3 give rise to illumination from the collimator arriving at the integrating optical plate with different angles of incidence.

The lenses on the first and second faces may have a substantially constant radius of curvature i.e. they may be regular spherical lenses (or lens portions) centered on an axis of symmetry, and this axis of symmetry is the surface normal as explained with reference to FIG. 2.

A normal Koehler lens pair is designed for a specific divergence angle of the light coming from the collimator (which itself is a function of the position on the collimator). Once the thickness of the optical plate is known the radius of the lenses is fixed.

The tessellation of the lens pairs that together form the optical plate is another parameter that can be selected. This determines the far field light distribution, such as a top hat or Gaussian or hexagonal distribution.

For the correct operation of a Koehler design, the acceptance angle limits the degree of collimation of the output beam. In order to preserve the degree of collimation while uniformly mixing all incoming rays across the angular output direction, the maximum beam angle needs to be smaller than the Koehler lens acceptance angle. A typical Koehler acceptance angle is for instance 2×20°.

Figure 4:
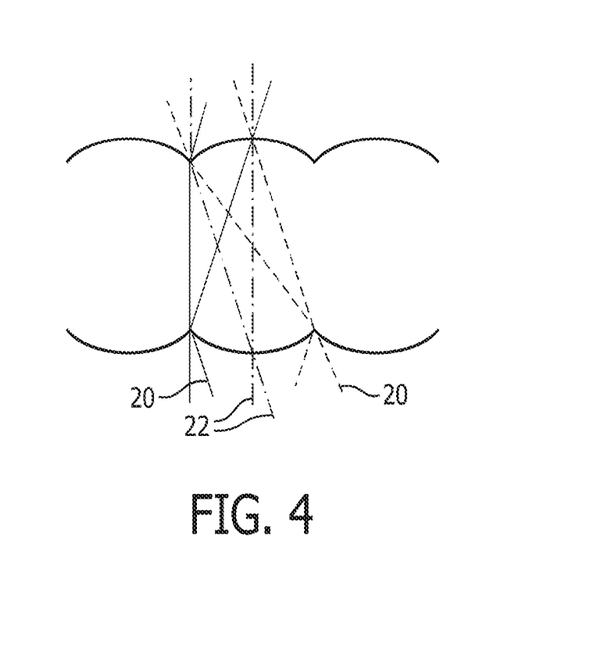
FIG. 4 shows how there is a maximum acceptance angle for the optical plate of FIG. 3.

FIG. 4 shows rays 20 of an incident beam at the maximum acceptance angle of the Koehler lens pair. As shown, the collimated beam 20 is focused to the very edge of the opposing lens. The angle of the beam 20 is for example 20° offset from the normal 22.

In many lighting applications a maximum beam angle beyond this value is desired.

In a regular Koehler design, the degree of collimation of the incident light is preserved. However, for practical design reasons (mostly related to the size of the Koehler element) the allowed degree of collimation is limited: confined to rather narrow beams from a lighting point of view. The tilting used in FIG. 2 modifies the Koehler design such that degree of collimation is not preserved: the extracted beam is broadened compared to the incident beam by modifying the extracting lens array.

The lens array is arranged in a two dimensional grid structure. The grid structure for example uses lenses having an outer shape which tessellates, such as rectangular lenses or hexagonal lenses. The grid structure is rotationally symmetric (with a finite order n of n-fold rotational symmetry), and for example comprises a hexagonal grid with 6-fold rotational symmetry. To fully tessellate the lenses, they will have a truncated hexagonal outer shape. Normally, hexagonal lens arrays directly result in a hexagonal beam spot in the far field, whereas a circular beam shape is desired.

The typical solution for this problem is a dedicated lens tessellation specifically designed in relation to the collimated light sources that differs from a hexagonal pattern.

The embodiments described herein make use of the tilting of the lenses at the output surface of the optical plate, to change the beam spot shape, to change the beam deflection and/or to correct for the selected tessellation of the lens. For example, it can be possible to use a hexagonal lens tessellation to achieve a circular far field light distribution.

Figure 5:
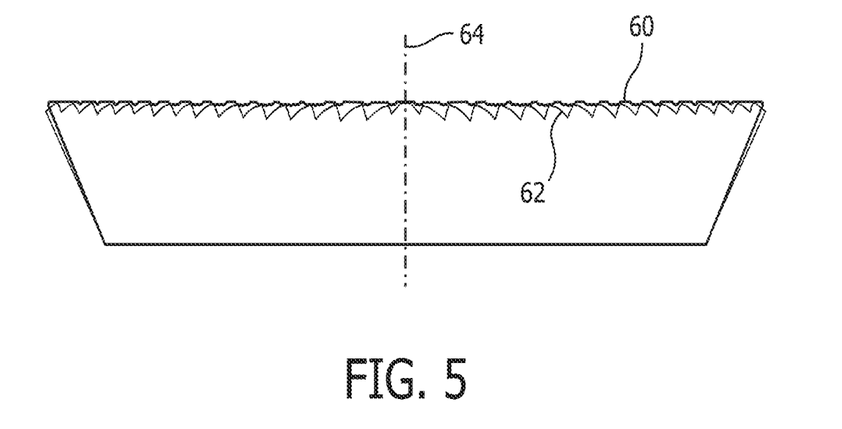
FIG. 5 shows the known optical plate and the modified optical plate superposed.

FIG. 5 shows the resulting design of the optical plate. It shows the conventional design 60 and the modified design 62 in accordance with examples of the invention superposed over each other.

In one example, the individual lenses form a hexagonal grid (in plan view). The lenses in this example are all slanted away from the central axis 64. In other words, the lenses on the output face of the optical plate are inclined so that their base plane lies in an inclined plane and their surface normal directions are inclined to the general normal direction.

As the two examples above show, the tilting of this inclined plane may be towards or away from the center of the optical plate. In either case, the surface normal 17 may cross the general normal for the optical plate (either above or below the optical plate, depending on the tilt). The curved part of each lens may have a constant radius of curvature, and may be rotationally symmetric about the surface normal direction. To form the inclined lenses into a continuous sheet, there may be step portions between the edges of adjacent lenses.

The central lens is not inclined. Furthermore, the lenses may not be tilted for an initial inner radial part of the optical plate (so that a subset of the lenses are is not tilted). The tilting may start at a particular radius out from the center, and the angle of tilt may also not be the same for all lenses. The radius of curvature may be the same for all lenses, but it may also not be the same for all lenses. Each lens has an associated single tilt angle value, but the tilt angle may be different for different distances from the center. At a given distance from the center, the tilt angle is the same for all lenses, to maintain the n-fold rotational symmetry of the optical plate.

The result is an arrangement which is preferably rotationally symmetric (with finite order). It can for example be formed as a regular hexagonal array.

Figure 6:
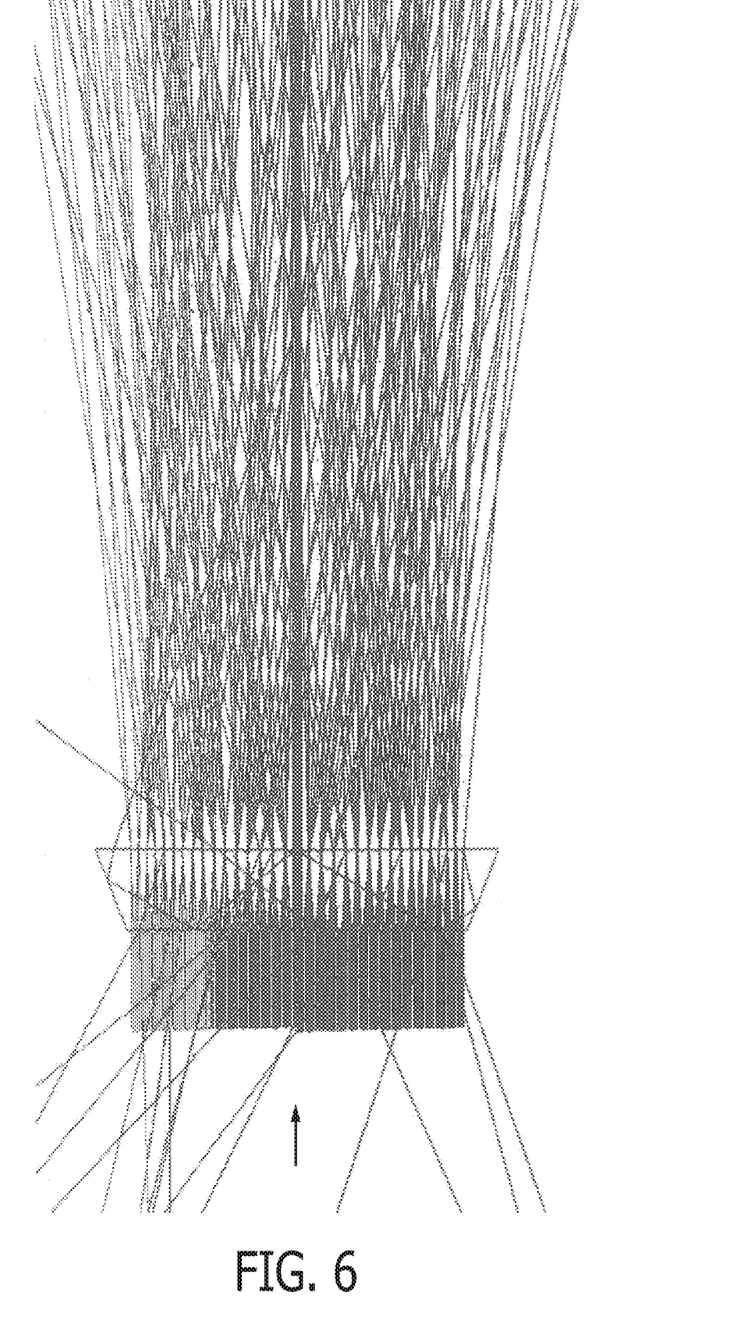
FIG. 6 is a ray diagram showing how the known optical plate processes incident collimated light.
Figure 7:
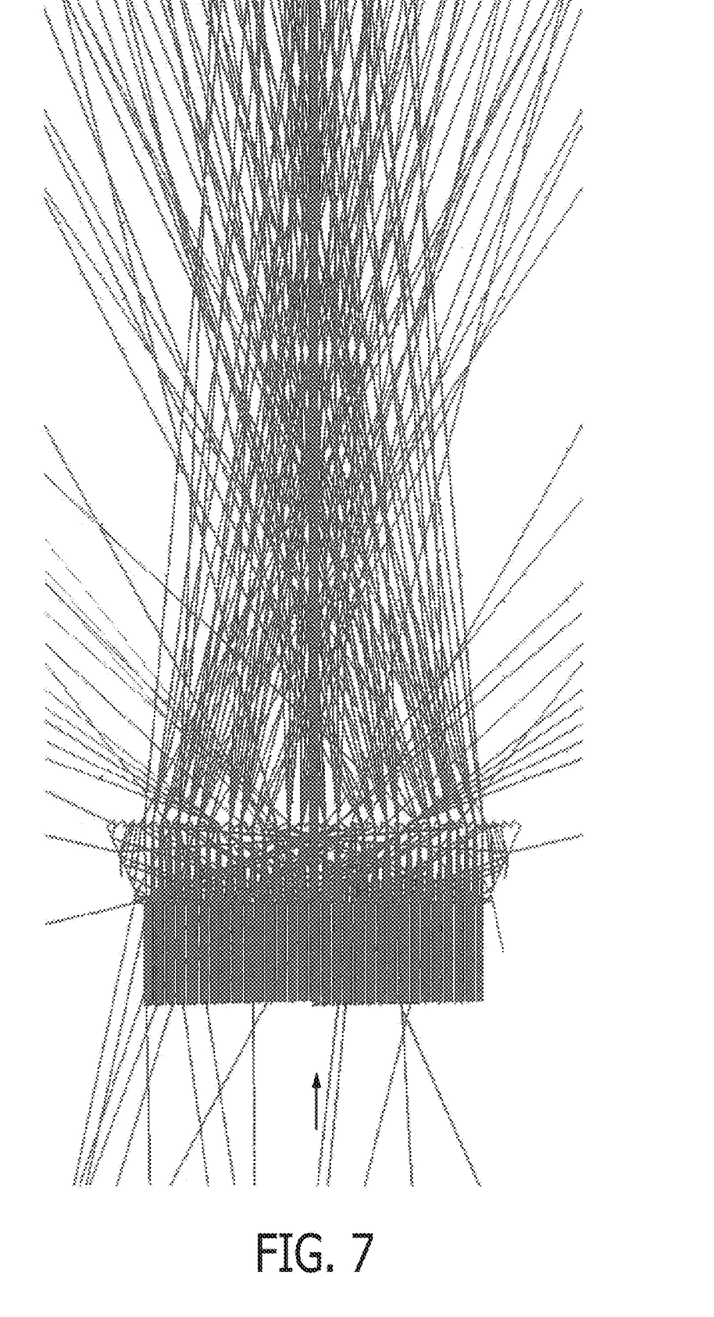
FIG. 7 is a ray diagram showing how the modified optical plate processes incident collimated light.

FIGS. 6 and 7 show how the output beam changes when an additional tilt of 30 degrees is added to each of the output lenses of the Koehler lens pairs. The angle of 30 degrees and the fact that the tilt is the same for all lenses is an arbitrary choice, and is for demonstration purposes only. The tilt angle may be different for different lenses, for example with a tilt angle which is a function of the radial distance from the center, for example an increasing or decreasing change in tilt angle with increasing radial distance from the center, said change may be gradual or alternatively may be in abrupt, significant steps.

FIG. 6 shows the beam paths when the conventional optical plate is illuminated by a perfectly collimated beam.

FIG. 7 shows the beam paths when the modified optical plate is illuminated by a perfectly collimated beam.

There are various stray beams caused by total internal reflections. Ignoring these stray beams, the general optical function can be observed.

Figure 8:
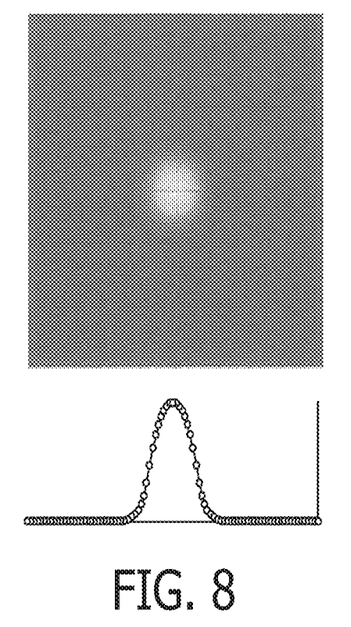
FIG. 8 shows the angular intensity function for an illuminated known optical plate.
Figure 9:
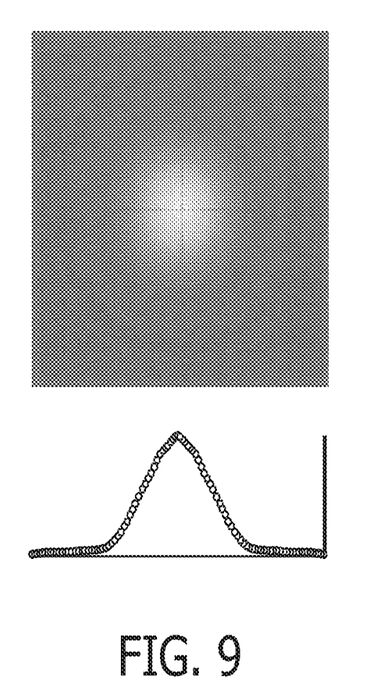
FIG. 9 shows the angular intensity function for an illuminated modified optical plate.

FIG. 8 shows the spot intensity for the conventional optical plate and FIG. 9 shows the spot intensity for the modified arrangement. The graphs show the intensity as a function of angle. The intensity profile shows the intensity in angular space, with angles in horizontal and vertical direction from −90 to +90 degrees. The cross-sectional graph shows the horizontal cross section of intensity versus angle at a vertical angle of 0 degrees.

The full width at half maximum (FWHM) of the beam changed from 20 to 30 degrees. This shows the possibility to make the beam as wide as desired, to match the desired properties of a spot light.

The color uniformity in the far field is still acceptable.

The distance between the paired lenses on the two faces will match the focal distance of the lenses. It is another design parameter which can be used to influence the optical performance.

There is a one-to-one mapping between lenses on the first face 15 and lenses on the second face 16. This enables accurate control of the light output characteristics from the optical plate.

The radii of the lenses in the array may all be identical. The tilt angle may increase towards the edge of the optical plate. If a surface modulation height is to be fixed, the lens pitch may then decrease towards the edge of the optical plate. Alternatively, the angle of tilt may be the same for all lenses. Furthermore, the use of a constant lens radius is not essential.

Figure 10:
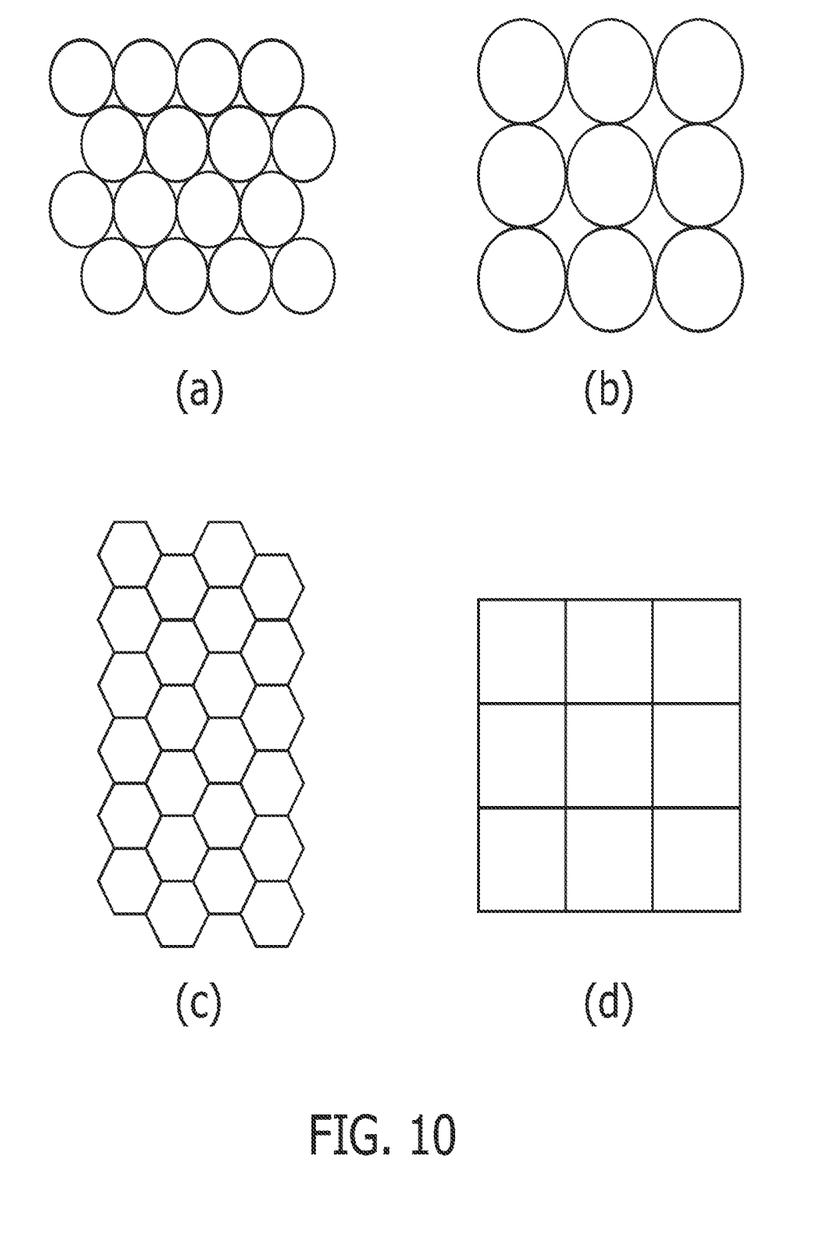
FIG. 10 shows four possible lens array designs.

As explained above, the lenses may be non-circular so that they tessellate to fill the area of the optical plate, but this is not essential. FIG. 10 shows four possible tessellations. FIG. 10(a) shows a tessellation of circular lenses in a hexagonal grid. As the circles do not tessellate perfectly, there are gaps between the lenses. FIG. 10(b) shows a tessellation of circular lenses in a square grid. FIG. 10(c) shows a tessellation of lenses truncated to a hexagonal shape, in a hexagonal grid. In this case, the lens shapes tessellate perfectly. FIG. 10(d) shows a tessellation of lenses truncated to a square shape, in a square grid.

If the inclination of the lenses increases towards the edge of the lens, then the inclination will cause the horizontal (plan view) area to decrease. This will interrupt the tessellation and may cause voids between the lenses. The lenses could also be moved together more closely to reduce these voids. When the top lenses are moved closer together the lenses at the bottom side of the plate are changed accordingly so that the top and bottom lenses match in surface area.

Voids are to be avoided for the best efficiency, and this can be achieved by using lenses having a shape which is a non-regular polygon.

The invention enables the lens tilt to be used as a design parameter to enable a desired optical function to be implemented.

The optical plates may comprise a polymeric material, for example one or more materials selected from the group consisting of PE (polyethylene), PP (polypropylene), PEN (polyethylene naphthalate), PC (poly-carbonate), polymethylacrylate (PMA), polymethylmethacrylate (PMMA) (Plexiglas or Perspex), cellulose acetate butyrate (CAB), silicone, polyvinylchloride (PVC), polyethylene terephthalate (PET), (PETG) (glycol modified polyethylene terephthalate), PDMS (polydimethylsiloxane), and COC (cyclo olefin copolymer). However, other (co)polymers may also be possible. Also, the optical plates may be made of glass.

When used as part of a spot light, the beam shaping arrangement shapes the output light from an LED or LED array to generate a circular light intensity pattern at the output. The spot light for example comprises an outer housing in which the LED or LED array and the beam shaping arrangement are mounted. As will be well known to those skilled in the art, suitable driver electronics will also be included within the housing for example converting a mains input to a dc drive signal for the LEDs.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An optical beam shaping arrangement, comprising:
a collimator for receiving light from an optical source, and providing a more collimated output; and
an optical plate for receiving the more collimated output, wherein the optical plate comprises a two dimensional array of lenses on an input side and a corresponding two dimensional array of lenses on the opposite output side,
wherein the lenses on the input side each have a focal point at a corresponding lens on the output side, and the lenses on the output side each have a focal point at a corresponding lens on the input side, and wherein at least some of the lenses on the output side are tilted with respect to the general plane of the optical plate.

2. The arrangement as claimed in claim 1, wherein at least some of the lenses are tilted towards or away from the center.

3. The arrangement as claimed in claim 1, wherein the array of lenses on the input side and the array of lenses on the output side have a finite rotational symmetry of order at least 4 about a center of rotation.

4. The arrangement as claimed in claim 3, wherein the grid pattern comprises a hexagonal grid.

5. The arrangement as claimed in claim 1, wherein the tilted lenses have an optical axis which is inclined to the normal of the general plane of the optical plate by a tilt angle, wherein the tilt angle is the same for all lenses at a same distance from the center.

6. The arrangement as claimed in claim 5, wherein the tilt angle is the same for all tilted lenses.

7. The arrangement as claimed in claim 1, wherein a tilt angle for all tilted lenses is below 40 degrees.

8. The arrangement as claimed in claim 1, wherein the collimator comprises a Fresnel lens.

9. A light unit, comprising:
a light source; and
an arrangement as claimed in claim 1 for beam shaping of the light output from the light source.

10. The light unit as claimed in claim 9, wherein the light source comprises an LED or an array of LEDs.

11. The light unit as claimed in claim 10, comprising an LED spotlight, wherein the arrangement provides a circular light intensity distribution in the far field.

* * * * *